United States Patent [19]
Mizuno et al.

[11] Patent Number: 6,137,672
[45] Date of Patent: Oct. 24, 2000

[54] LAMINATED ELECTRONIC PART, METHOD FOR THE PRODUCTION THEREOF, AND DIELECTRIC CERAMIC COMPOSITION

[75] Inventors: Youichi Mizuno; Yasuyuki Inomata; Toshikazu Toba; Hirokazu Chazono, all of Tokyo, Japan

[73] Assignee: Taiyo Yuden Co., Ltd., Tokyo, Japan

[21] Appl. No.: 09/018,912

[22] Filed: Feb. 5, 1998

[30] Foreign Application Priority Data

Feb. 10, 1997 [JP] Japan ................................. 9-041598

[51] Int. Cl.[7] .............................. H01G 4/06; H01B 3/12; C04B 35/46
[52] U.S. Cl. ................................. 361/321.4; 361/321.3; 361/303; 361/311; 501/108; 501/134; 501/153; 501/154
[58] Field of Search ............................ 361/301.1, 303, 361/311, 312, 313, 320, 321.1, 321.2, 321.3, 321.4, 321.5; 501/108, 118, 122, 134, 135, 136, 153, 154

[56] References Cited

U.S. PATENT DOCUMENTS

| | | | |
|---|---|---|---|
| 4,755,493 | 7/1988 | Takeuchi et al. | 501/134 |
| 4,874,716 | 10/1989 | Roa | 437/43 |
| 5,006,956 | 4/1991 | Kawakita et al. | 361/321.5 |
| 5,101,319 | 3/1992 | Diffeyes et al. | 361/321 |
| 5,254,360 | 10/1993 | Crownover et al. | 427/79 |
| 5,534,290 | 7/1996 | Rainwater et al. | 427/97 |
| 5,629,252 | 5/1997 | Nishimoto et al. | 501/136 |
| 5,683,790 | 11/1997 | Suzuki et al. | 428/210 |
| 5,687,055 | 11/1997 | Miki | 361/305 |
| 5,786,978 | 7/1998 | Mizuno | 361/321.5 |

*Primary Examiner*—Kristine Kincaid
*Assistant Examiner*—Eric W. Thomas
*Attorney, Agent, or Firm*—Ronald R. Snider; Snider & Associates

[57] ABSTRACT

The process for the production of a laminated electronic part containing a major component as represented by general formula:

$$X(Mg_aZn_{(1-a)})_xSiO_{x+2}\text{—}YAl_2O_3\text{—}ZSrTiO_3$$

(where symbol a is defined by: $0.1 \leq a \leq 0.8$; and symbol x is defined by: $\leq x \leq 1.5$);
and an additive component comprised of a compound containing one or more elements selected from Nb, Ta and W;
wherein a mole percent ratio of magnesium zinc silicate, $(Mg_aZn_{(1-a)})_xSiO_{x+2}$, (X), to alumina, $Al_2O_3$, (Y), and strontium titanate, $SrTiO_3$, (Z), each of which constitutes said major component, is set to be located in a region enclosed by a polygon having apexes at points A, B, C and D, as defined below, in a three-component composition map:

| | | |
|---|---|---|
| A (94.9, | 0.1, | 5.0) |
| B (85.0, | 10.0, | 5.0) |
| C (65.0, | 10.0, | 25.0) |
| D (65.0, | 0.1, | 34.9); | and the additive component is contained at a rate of 0.01 to 0.2 mole percent, when translated into $NbO_{5/2}$, $TaO_{5/2}$ or $WO_3$.

5 Claims, 2 Drawing Sheets

LAMINATED ELECTRONIC PART, METHOD FOR THE PRODUCTION THEREOF, AND DIELECTRIC CERAMIC COMPOSITION

CROSS-REFERENCE

This application claims the priority of Japanese Patent Application No. H9-41,598, filed on Feb. 10, 1997, which is incorporated herein by reference.

BACKGROUND OF THE INVENTION

1. Field of the Invention

The present invention relates to a laminated electronic part, a method for the production thereof, and a dielectric ceramic composition and, more particularly, to a laminated ceramic capacitor having a capacitance as low as from approximately 0.01 pF to 30 pF, suitable for use in a high frequency region of, for example, from several hundreds MHz to several GHz, a method for the production thereof, and a dielectric ceramic composition suitable for use in forming a dielectric ceramic layer of a such laminated electronic part.

2. Description of the Related Art

A variety of substances is known as a material for a dielectric ceramic layer of a laminated ceramic capacitor having a low capacitance for use in a high frequency region. One of such substances is, for example, a dielectric ceramic composition of a $(Mg_aZn_{(1-a)})_xSiO_{x+2}$ (hereinafter sometimes referred to as "MZS")—$Al_2O_3$—$SrTiO_3$ type.

As silica materials for use as part of the MZS, there has generally been employed a crystalline silica material. The major component of the crystalline silica material is $SiO_2$ and this component is very hard. Further, silica material commercially available is one of a crystalline type ($\alpha$-quartz) and so large in particle size (an average particle size being 3 $\mu$m or larger and the maximum size being 8 $\mu$m or larger) and so wide in a particle distribution. Moreover, such silica material is so low in a fracture toughness value that it is likely to become an isotropic in shape (an angular shape) when it is finely divided into fine particles by grinding.

In order to obtain finely divided silica powder, there has hitherto been employed a method which involves classifying a supernatant of a suspension of pulverized silica powders. This method, however, can provide fine silica powders having particle sizes as small as approximately 1.5 $\mu$m and yet having angular shapes.

Therefore, the MZS powders prepared from such silica powders having such large particle sizes and angular shapes have particles shapes of such silica powders as raw materials still left therein, resulting in angular shapes having coarse or rough surfaces.

When a green sheet is prepared from such MZS of an angular shape, the surface of the resulting green sheet may become coarse or rough, thereby impairing uniformity in the thickness of a dielectric ceramic layer and worsening a distribution of capacitance of laminated ceramic capacitors.

Further, if the green sheet becomes coarse or rough on its surface, an internal electrode to be formed thereon may be made irregular and uneven on its surface, thereby elevating a surface resistance of the internal electrode and impairing frequency properties of factor Q, particularly in a high frequency region.

Moreover, the such green sheet may become narrow in an optimum range of binder amounts, thereby making the binder amount likely to become excessive or too small. If the binder amount would become too large, on the one hand, mold flashing may be occurred to a great extent upon cutting into chips and such flashes cannot be thoroughly removed even if they are to be processed with a barrel. If the binder amount would be too small, on the other, a sheet-binding strength may be decreased, thereby causing the laminated layers to deviate from each other or air to be mixed therein. This may cause a decrease in reliability.

Moreover, the green sheet prepared from the such MZS has a high shrinkage initiation temperature so that the resulting laminated ceramic capacitors may be delaminated readily upon calcination.

A copending patent application is directed to a dielectric ceramic composition of a MZS—$Al_2O_3$—$SrTiO_3$ type as represented by the following general formula:

$$X(Mg_aZn_{(1-a)})_xSiO_{x+2}—YAl_2O_3—ZSrTiO_3$$

(where symbol a is defined by: $0.1 \leq a \leq 0.8$; and symbol x is defined by: $0.67 \leq x \leq 1.5$);
in which a mole percent ratio of $(Mg_aZn_{(1-a)})_xSiO_{x+2}$ to $Al_2O_3$ to $SrTiO_3$ is located in a region enclosed by a polygon having apexes at points A, B, C and D in a three-component composition map as defined as follows:

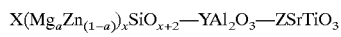

| A (94.9, | 0.1, | 5.0) |
| B (85.0, | 10.0, | 5.0) |
| C (65.0, | 10.0, | 25.0) |
| D (65.0, | 0.1, | 34.9). |

This dielectric ceramic composition has superior properties that it can be sintered at temperature of 1,100° C. or lower, a dielectric constant $\epsilon_r$ is as low as 15 or less and no delamination may be caused to occur even when pure Pd is used as material for an internal electrode.

The dielectric ceramic compositions involved in the copending patent application, however, suffers from the difficulty that a somewhat large amount of leak current may be caused when it is used for a dielectric ceramic layer of laminated ceramic capacitors.

SUMMARY OF THE INVENTION

The present invention has an object to provide a laminated electronic part having favorable frequency properties of Q value particularly in a high frequency region and least possible leak current of lower than 1.0 $\mu$A at 125° C. and −600 V.

The present invention has another object to provide a method for the production of a such laminated electronic part.

In a preferred aspect, the present invention has a further object to provide a highly reliable laminated electronic part having a wide range of optimum values at which to use a binder and a plasticizer, good properties to cause less mold flashing upon cutting into laminated chips, a high sheet-binding strength, and favorable properties to cause no or less delamination and to mix air therein.

In another preferred aspect, the present invention has a still further object to provide a method for the production of such a highly reliable laminated electronic part.

In a further preferred aspect, the present invention has an object to provide a laminated electronic part that can be sintered at temperature of 1,100° C. or lower, that causes no or little delamination even if pure Pd is used as material for an internal electrode, that has a dielectric constant $\epsilon_r$ as low as 15 or less, and that has the greatest possible resistance to insulation.

In order to achieve the objects in one aspects as described hereinabove, the present invention provides a laminated electronic part in which one ceramic layer or more ceramic layers is or are laminated alternately with two internal electrodes or more and an interface between the ceramic layer and the internal electrode has a surface roughness in the range of 0 μm to 0.2 μm.

In order to achieve the objects in the other aspects as described hereinabove, the present invention provides a method for the preparation of a such laminated electronic part which comprises the step of calcinating a mixture containing $SiO_2$; the step of preparing a ceramic raw material containing the calcinated material obtained in the previous step; the step of forming a laminated material in such a manner that a non-sintered ceramic layer composed of the ceramic raw material is laminated alternately with a layer having an internal electrode pattern; the step of calcining the laminated material; and the step of forming an outer electrode on the resulting laminated material; wherein there is employed $SiO_2$ having an average primary particle size ranging from 80 nm to 0.5 μm and a particle shape of a generally spherical form.

Moreover, in order to achieve the objects in the still other aspects as described hereinabove, the present invention provides a dielectric ceramic composition comprising a main component and an additive component, the main component being as represented by general formula:

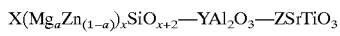

$X(Mg_aZn_{(1-a)})_xSiO_{x+2}$—$YAl_2O_3$—$ZSrTiO_3$ (where symbol a is defined by: $0.1 \leq a \leq 0.8$; and symbol x is defined by: $0.67 \leq x \leq 1.5$);
and the additive component being a compound composed of one or more elements selected from Nb, Ta and W; wherein a mole percent ratio of $(Mg_aZn_{(1-a)})_xSiO_{x+2}$ to $Al_2O_3$ to $SrTiO_3$ is located in a region enclosed by a polygon having apexes at points A, B, C and D in a three-component composition map as defined as follows:

| | | |
|---|---|---|
| A (94.9, | 0.1, | 5.0) |
| B (85.0, | 10.0, | 5.0) |
| C (65.0, | 10.0, | 25.0) |
| D (65.0, | 0.1, | 34.9); | and wherein the additive component is contained at a rate of from 0.01% to 0.2% by mole, when translated into $NbO_{5/2}$, $TaO_{5/2}$ or $WO_3$.

These and other objects, features and advantages of the present invention will become apparent in the course of the description which follows, with reference to the accompanying drawings.

DESCRIPTION OF THE PREFERRED EMBODIMENTS

Figure 1:
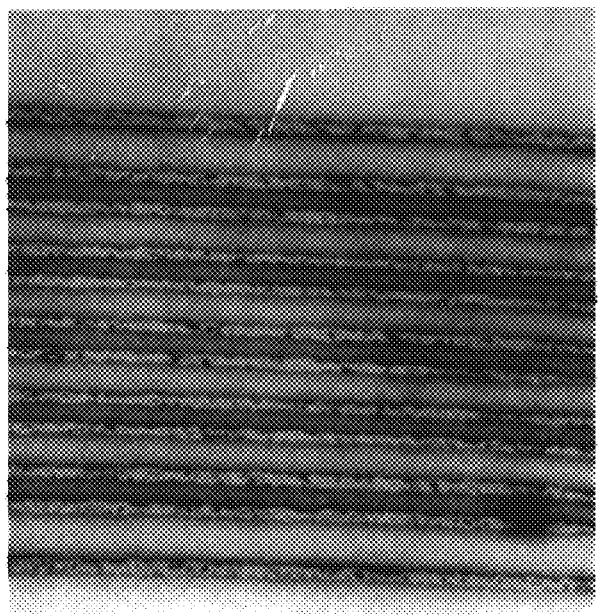
FIG. 1 is a microscopic picture showing a section of a laminated ceramic capacitor according to Example 1 of this invention.

The laminated electronic part according to the present invention has one ceramic layer or more ceramic layers laminated alternately with two internal electrodes or more, in which an interface between the ceramic layer and the internal electrode is set so as to have a surface roughness in the range of 0 μm to 0.2 μm.

For material for the internal electrode, there can also be used Pd, although Ag or Pt may be used. The laminated electronic parts may be laminated ceramic condensers in which the dielectric ceramic composition is used as a material for the ceramic layer.

When the laminated electronic part comprises the laminated ceramic capacitor, for example, there may be used, as a dielectric ceramic composition, a sintered material of a mixture containing a major component composed of MZS, $Mg_aZn_{(1-a)})_xSiO_{x+2}$, alumina, $Al_2O_3$, and strontium titanate, $SrTiO_3$, the MZS obtained by calcinating MgO, ZnO and $SiO_2$, although a sintered material of a mixture containing a composition other than the above composition may also be used as long as any material contains the MZS.

Further, where a sintered material of a mixture containing the MZS, alumina, $Al_2O_3$, and strontium titanate, $SrTiO_3$, as the major components, the MZS obtained by sintering MgO, ZnO and $SiO_2$, is used as the dielectric ceramic composition for forming the ceramic layer, there may also be used a dielectric ceramic composition having a composition containing a major component as represented by general formula:

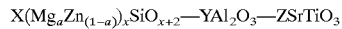

$X(Mg_aZn_{(1-a)})_xSiO_{x+2}$—$YAl_2O_3$—$ZSrTiO_3$ (where symbol a is defined by: $0.1 \leq a \leq 0.8$; and symbol x is defined by: $0.67 \leq x \leq 1.5$);
and the additive component being a compound composed of one or more elements selected from Nb, Ta and W; wherein a mole percent ratio of $(Mg_aZn_{(1-a)})_xSiO_{x+2}$ to $Al_2O_3$ to $SrTiO_3$ is located in a region enclosed by a polygon having apexes at points A, B, C and D in a three-component composition map as defined as follows:

| | | |
|---|---|---|
| A (94.9, | 0.1, | 5.0) |
| B (85.0, | 10.0, | 5.0) |
| C (65.0, | 10.0, | 25.0) |
| D (65.0, | 0.1, | 34.9); | and wherein the additive component is contained at a rate of from 0.01% to 0.2% by mole, when translated into $NbO_{5/2}$, $TaO_{5/2}$ or $WO_3$.

The mole percent ratio of the MZS is set to the above range because a finely sintered material cannot be obtained by calcining at temperature of 1,100° C. or lower, the dielectric constant $\epsilon_r$ may become larger than 15, and a temperature coefficient TCC may become too high toward the minus side, if the mole percent ratio deviates the above range.

Further, the reason for setting the mole percent ratio of alumina, $Al_2O_3$, to the above range is because a finely sintered material cannot be prepared by calcining at temperature lower than 1,100° C. if the mole percent ratio of alumina, $Al_2O_3$, deviates the above range.

Moreover, the mole percent ratio of strontium titanate, $SrTiO_3$, is set to the above range due to the fact that the dielectric constant $\epsilon_r$ may become greater than 15 and the temperature coefficient TCC may become too large toward the minus side, on the onehand, if the mole percent ratio of the strontium titanate, $SrTiO_3$, becomes greater than the upper limit and that a finely sintered material cannot be prepared by calcining at temperature lower than 1,100° C., on the other, if the mole percent ratio of the strontium titanate, $SrTiO_3$, becomes lower than the lower limit.

The symbol a is set to the above range are because a finely sintered material cannot be prepared by calcining at temperature lower than 1,100° C., on the one hand, in the case where the symbol a becomes greater than the upper limit and because a large number of pores may be caused to be formed in the inside of the sintered material and the factor Q may become smaller than 10,000, on the other, in the case where the symbol a becomes smaller than the lower limit.

Moreover, the value of the symbol x is set to the above range because a finely sintered material cannot be prepared by calcining at temperature of 1,100° C. or lower, on the one hand, if the value of the symbol x becomes too large above the upper limit, and because a range of optimum temperature upon calcining may become too narrow and the resulting material may become likely to fuse, pores may be formed in a large number in the resulting sintered material, and the factor Q may become smaller than 1,000.

In addition, the additive components are set to a range of 0.01 to 0.2 mole percent, when translated into $NbO_{5/2}$, $TaO_{5/2}$ or $WO_3$, because no or little effects of improvements in leak current can be attained, on the one hand, in the case where the range of the additive components becomes smaller than 0.01 mole percent, and no finely sintered material can be obtained by calcining at temperature of 1,100° C. or lower, on the other, in the case where it becomes greater than 0.2 mole percent. The similar effects can be achieved even if these additive components may be added singly or in a state of a mixture with the other.

The laminated electronic parts according to the present invention may be prepared by the process comprising the step of calcinating a mixture containing $SiO_2$; the step of preparing a ceramic raw material containing the calcinated material obtained in the previous step; the step of forming a laminated material in such a manner that a non-sintered ceramic layer composed of the ceramic raw material is laminated alternately with a layer having an internal electrode pattern; the step of calcining the laminated material; and the step of forming an outer electrode on the resulting laminated material; wherein there is employed $SiO_2$ having an average primary particle size ranging from 80 nm to 0.5 μm and a particle shape of a generally spherical form.

In this process according to the present invention, the step of forming the laminated material containing the $SiO_2$ mixture with MgO and ZnO further added thereto may comprise the step of forming a non-sintered ceramic sheet containing the MZS obtained by calcination as part of the major component, the step of forming an internal electrode pattern on the resulting non-sintered ceramic sheet, and the step of laminating the non-sintered ceramic sheets each with the internal electrode pattern formed thereon.

As $SiO_2$ to be contained in the laminated material, there may be used one of a crystalline type or an amorphous type although $SiO_2$ of an amorphous type is preferred from the point of view of preparing such fine particles. Further, as the non-sintered ceramic sheets, there may be used ones containing, for example, MZS, alumina, $Al_2O_3$, and strontiumtitanate, $SrTiO_3$, as the major components, although there may be used any one having a composition other than the above ones, as long as they contain MZS.

Although desired properties can be achieved by calcinating the mixture consisting of MZS, alumina, $Al_2O_3$, and strontium titanate, $SrTiO_3$, or without calcinating, electrical properties may vary with calcination. The calcination, however, is effective if a reaction between the additive components and the major components or between the additive components is caused to occur and a crystal system is caused to change, thereby causing a shrinkage rapidly or increasing a shrinkage ratio. In other words, it is useful for controlling an occurrence of structural defects such as delamination, cracking or the like.

When there is used a non-sintered ceramic sheet containing the major component consisting of the MZS, alumina, $Al_2O_3$, and strontium titanate, $SrTiO_3$, the MZS being obtained by calcinating MgO, ZnO and $SiO_2$, a non-sintered ceramic sheet is preferred which has a composition containing a major component as represented by general formula:

$$X(Mg_aZn_{(1-a)})_xSiO_{x+2}—YAl_2O_3—ZSrTiO_3$$

(where symbol a is defined by: $0.1 \leq a \leq 0.8$; and symbol x is defined by: $0.67 \leq x \leq 1.5$);
and the additive component being a compound composed of one or more elements selected from Nb, Ta and W; wherein a mole percent ratio of $(Mg_aZn_{(1-a)})_xSiO_{x+2}$ to $Al_2O_3$ to $SrTiO_3$ is located in a region enclosed by a polygon having apexes at points A, B, C and D in a three-component composition map as defined as follows:

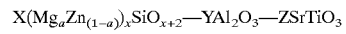

| A (94.9, | 0.1, | 5.0) |
| B (85.0, | 10.0, | 5.0) |
| C (65.0, | 10.0, | 25.0) |
| D (65.0, | 0.1, | 34.9); | and wherein the additive component is contained at a rate of from -0.01% to 0.2% by mole, when translated into $NbO_{5/2}$, $TaO_{5/2}$ or $WO_3$.

The components of the non-sintered ceramic sheet are set each to the above-defined composition range for the reasons as described hereinabove for the composition range of the dielectric ceramic compositions as described hereinabove.

The dielectric ceramic composition according to the present invention comprises the major component as represented by the general formula:

$$X(Mg_aZn_{(1-a)})_xSiO_{x+2}—YAl_2O_3—ZSrTiO_3$$

Figure 3:
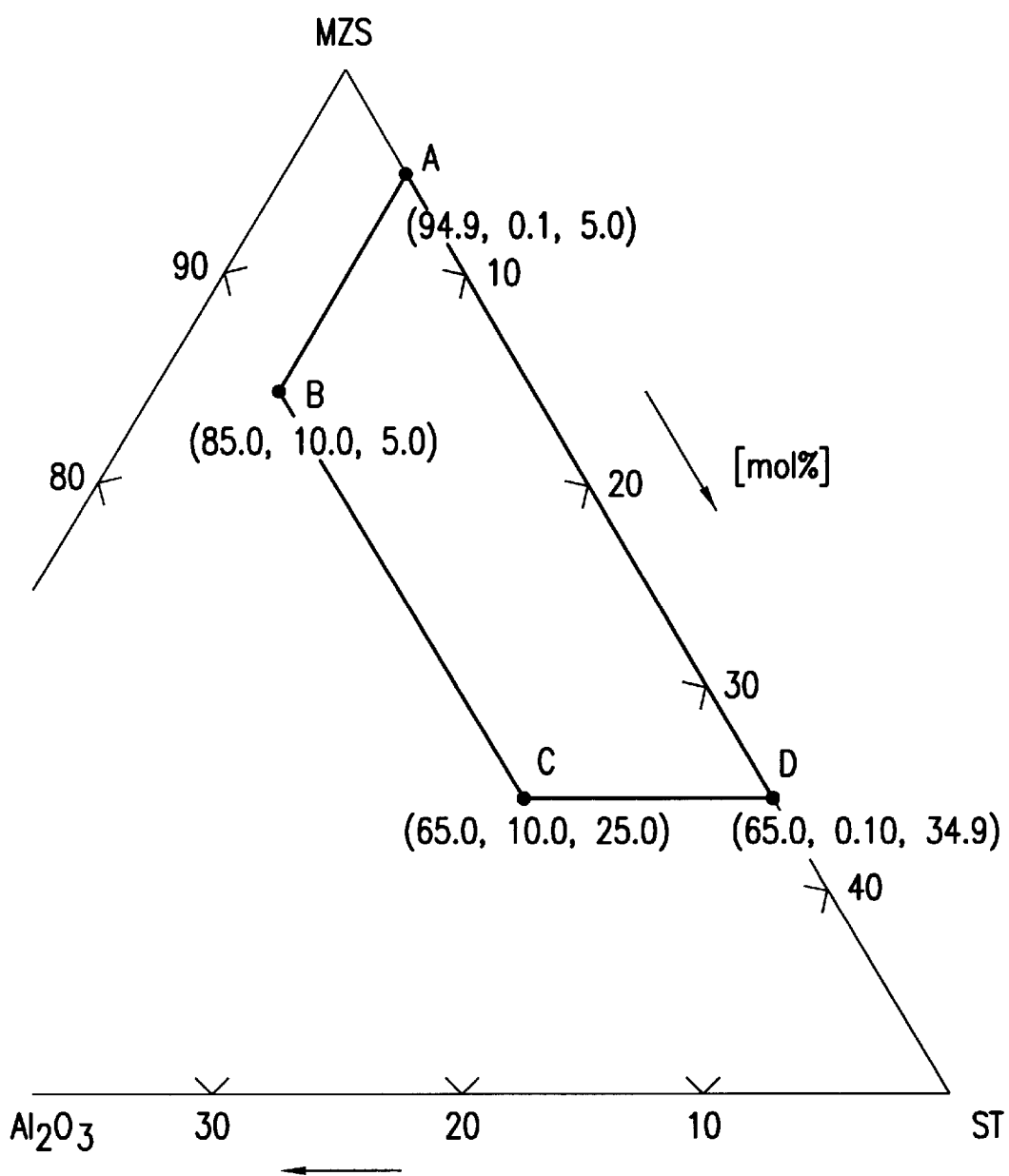
FIG. 3 is a three-component composition map showing a mole percent ratio of MZS to $Al_2O_3$ to $SrTiO_3$.

(where symbol a is defined by: $0.1 \leq a \leq 0.8$; and symbol x is defined by: $0.67 \leq x \leq 1.5$);
and the additive component being a compound composed of one or more elements selected from Nb, Ta and W; wherein a mole percent ratio of $(Mg_aZn_{(1-a)})_xSiO_{x+2}$ to $Al_2O_3$ to $SrTiO_3$ is located in a region enclosed by a polygon having apexes at points A, B, C and D in a three-component composition map as shown in FIG. 3 and as defined as follows:

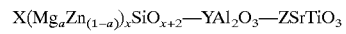

| A (94.9, | 0.1, | 5.0) |
| B (85.0, | 10.0, | 5.0) |
| C (65.0, | 10.0, | 25.0) |
| D (65.0, | 0.1, | 34.9); | and wherein the additive component is contained at a rate of from 0.01% to 0.2% by mole, when translated into $NbO_{5/2}$, $TaO_{5/2}$ or $WO_3$.

The components of the dielectric ceramic composition are set each to the composition range for the reasons as described hereinabove for the composition range of the dielectric ceramic compositions.

The present invention will be described more in detail by way of examples.

EXAMPLE 1

As raw materials, MgO, ZnO and $SiO_2$ were weighed at proportions as indicated in Table 1 below and they were pulverized with a ball mill in a wet state for 15 hours, thereby yielding a slurry consisting those components. In this example, as $SiO_2$, there was used amorphous silica having an average primary particle size of 0.1 μm and a generally spherical particle shape.

Next, the resulting slurry was taken out from the ball mill and filtered, followed by drying the cake portion in a dryer at 150° C. for a time sufficient to finely dividing the cake into powder. The resulting mixture powder was then placed in an oven and calcinated at 850 to 1,200° C. in ambient atmosphere to allow a mutual reaction of the compounds constituting the mixture, thereby yielding MZS. A relationship of the components with the calcinating temperatures is shown in Table 2 below.

Then, the MZS obtained by calcination was placed in a ball mill to grind it in a wet state to a sufficient extent to thereby yield a slurry of the MZS. The resulting slurry was then taken out from the ball mill and filtered, followed by drying the cake portion at 150° C. for a sufficient time to yield MZS powder. The MZS, alumina, $Al_2O_3$, and strontium titanate, $SrTiO_3$, were weighed at the proportions as indicated in Table 3 below, and they were placed in a ball mill and mixed well in a wet state yielding a slurry of the mixture.

The resulting slurry of the mixture was then filtered and dried in a dryer at 150° C. to a sufficient extent to yield powder of the mixture. The mixture powder in turn was mixed well with a solvent binder to form a slurry which in turn was coated by the doctor blade method to form a green sheet. The green sheet was measured for a surface roughness $R_A$ and the result is shown in Table 4 below.

On the green sheet was printed an internal electrode pattern composed of an Ag paste, and the plural green sheets so prepared were laminated on each other so as for the internal electrode pattern printed on a one sheet to overlap lengthwise by a half with the pattern printed on the other adjacent sheet laminated thereon. The laminated green sheets were then pressed from a thickness direction to bind them to each other. The resulting laminated material was then cut into cubes yielding laminate chips.

The resulting laminate chips were then heated in ambient atmosphere to burn out the organic binder contained in the green sheets, followed by calcining them at 1,000° C. for 2 hours to sinter the laminate chips. The laminate chip so prepared was then cut and the cut section was polished for observation with a microscope. The microscopic picture is indicated in FIG. 1.

The laminate chip was coated on its both end sides with an Ag paste and baked at 700° C. for 15 minutes, thereby yielding a laminated chip capacitor having a capacitance of 1 pF. The high frequency property (factor Q) of the laminate chip capacitor is shown in Table 5 below.

COMPARATIVE EXAMPLE 1

As $SiO_2$ as one of the starting materials of MZS, there was used a crystalline silica having an angular particle shape and an average primary particle size of 3 μm. By using the above silica as $SiO_2$, MZS was prepared in substantially the same manner as in Example 1. The relationship of the MZS components with the calcining temperature is shown in Table 2 below.

Then, a green sheet was prepared from the MZS prepared above in substantially the same manner as in Example 1. The green sheet was measured for a surface roughness $R_A$ and the result is shown in Table 4.

Figure 2:
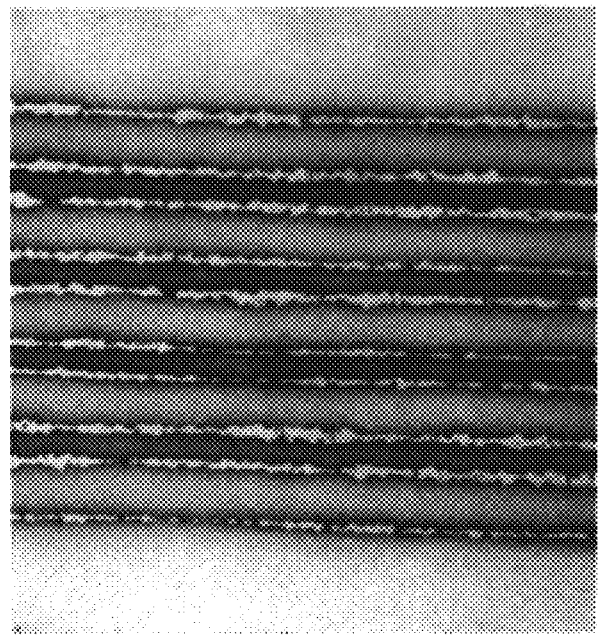
FIG. 2 is a microscopic picture showing a section of a laminated ceramic capacitor according to Comparative Example 1 of this invention.

Laminate chips were prepared from the green sheet so formed and calcined in substantially the same manner as in Example 1, thereby yielding calcined laminate chips. The laminate chip was then cut and the cut section was polished for observation with a microscope. The microscopic picture is indicated in FIG. 2.

The laminate chip was coated on its both end sides with an Ag paste and baked at 700° C. for 15 minutes, thereby yielding a laminated chip capacitor having a capacitance of 1 pF. The high frequency property (factor Q) of the laminate chip capacitor is shown in Table 5 below.

TABLE 1

|  | MgO | ZnO | $SiO_2$ |
|---|---|---|---|
| Example 1 | 20 | 30 | 50 (Amorphous) |
| Comparative Example 1 | 20 | 30 | 50 (Crystalline) |

Unit: mol %

TABLE 2

|  | 850° C. | 1000° C. | 1100° C. | 1200° C. |
|---|---|---|---|---|
| Example 1 | $MZ_2S$ ZnO | $MZ_2S$ | $MZ_2S$ | $MZ_2S$ |
| Comparative Example 1 | MgO ZnO $SiO_2$ | $MZ_2S$ $SiO_2$ | $MZ_2S$ $SiO_2$ | $MZ_2S$ $SiO_2$ |

$MZ_2S = (Mg_x, Zn_{1-x})_2 SiO_4$

TABLE 3

|  | MZS (Calcinating Temp.) | $Al_2O_3$ | $SrTiO_3$ |
|---|---|---|---|
| Example 1 | 89.0 (1050° C.) | 1.0 | 10.0 |
| Comparative Example 1 | 89.0 (1050° C.) | 1.0 | 10.0 |

Unit: mol %

TABLE 4

|  | Crystal Structure | $R_A$ Average Sheet Surface Roughness |
|---|---|---|
| Example 1 | Amorphous Silica | 0.08 μm |
| Comparative Example 1 | Crystalline Silica | 0.15 μm |

TABLE 5

|  | 1 GHz | 2 GHz | 3 GHz |
|---|---|---|---|
| Example 1 | 1650 | 820 | 420 |
| Comparative Example 1 | 1550 | 260 | 105 |

From the results of Table 5, it can be found that the laminate chips prepared in Example 1 have an advantage in respect to the high frequency properties (factor Q) over those prepared in Comparative Example 1, in which the laminate chips of Example 1 have a smoother average surface roughness $R_A$ of the green sheet (refer to Table 4) and a smoother interface between the dielectric ceramic layer and the internal electrode (refer to FIGS. 1 and 2) than those of Comparative Example 1.

Although the green sheet was prepared in Example 1 by using the MZS, alumina, $Al_2O_3$, and strontium titanate, $SrTiO_3$, a green sheet was prepared in substantially the same manner as Example 1 except for adding $NbO_{5/2}$ and $WO_3$. In this case, too, the resulting laminate chip indicated an advantage over that of Comparative Example 1. Further, a foregoing description was made of the laminated ceramic capacitor as an example. It is found that similar experiments made for a laminated inductor and a laminated LC part have achieved a similar advantage.

EXAMPLES 2–49 & COMPARATIVE EXAMPLES 2–19

MgO, ZnO and $SiO_2$ were weighed at proportions as indicated in Tables 6 ① to 1 ③ and the mixture was placed in a ball mill. In the ball mill, they were pulverized and mixed in a wet state for 15 hours, thereby yielding a slurry of the mixture. The resulting slurry was then taken out from the ball mill and filtered, followed by drying the cake portion in a dryer at 150° C. to yield a powder of the mixture.

The resulting mixture powder was then placed in an oven and calcinated at 900 to 1,200° C. to allow a mutual reaction of the compounds constituting the mixture, thereby yielding MZS. In Examples 45–49, however, no calcination was carried out.

Then, the MZS so prepared was placed in a ball mill to pulverize in a wet state to a sufficient extent to yield a slurry of the MZS. The resulting slurry was then taken out from the ball mill and filtered, followed by drying the cake portion at 150° C. for a sufficient time to yield MZS powder.

Thereafter, MZS, alumina, $Al_2O_3$, strontium titanate, $SrTiO_3$, and niobium oxide, $Nb_2O_3$, were weighed at the proportions as indicated in Tables 6 ① to 1 ③ below, and they were placed in a ball mill and mixed well in a wet state yielding a slurry of the mixture. The resulting slurry of the mixture was then taken out from the ball mill and filtered, followed by drying in a dryer at 150° C. to a sufficient extent to yield powder of the mixture.

The mixture powder was then placed in an oven and calcinated at 700° C. to 900° C. for 2–4 hours. In Examples 2–14, 21–24, 26, 27 and 29–49 and Comparative Examples 2–10 and 12–19, however, no calcination was carried out.

TABLE 6

| | | I | | | | II | | | |
|---|---|---|---|---|---|---|---|---|---|
| | evaluation | MZS | a | x | Calcinating Temp. (° C.) | $Al_2O_3$ | ST | Additional Component | Amount | Calcinating Temp. (° C.) |
| Comp. Ex. 2 | X | 94.5 | 0.8 | 1.0 | 1100 | 5.5 | 0.0 | $NbO_{5/2}$ | 0.01 | — |
| Comp. Ex. 3 | X | 89.5 | 0.8 | 1.0 | 1100 | 5.0 | 5.5 | $NbO_{5/2}$ | 0 | — |
| Comp. Ex. 4 | X | 89.5 | 0.8 | 1.0 | 1100 | 5.0 | 5.5 | $NbO_{5/2}$ | 0.005 | — |
| Example 2 | ○ | 89.5 | 0.8 | 1.0 | 1100 | 5.0 | 5.5 | $NbO_{5/2}$ | 0.01 | — |
| Example 3 | ○ | 89.5 | 0.8 | 1.0 | 1100 | 5.0 | 5.5 | $NbO_{5/2}$ | 0.1 | — |
| Example 4 | ○ | 89.5 | 0.8 | 1.0 | 1100 | 5.0 | 5.5 | $NbO_{5/2}$ | 0.2 | — |
| Comp. Ex. 5 | X | 89.5 | 0.8 | 1.0 | 1100 | 5.0 | 5.5 | $NbO_{5/2}$ | 0.4 | — |
| Example 5 | ○ | 89.5 | 0.8 | 1.0 | 1100 | 5.0 | 5.5 | $TaO_{5/2}$ | 0.1 | — |
| Example 6 | ○ | 89.5 | 0.8 | 1.0 | 1100 | 5.0 | 5.5 | $WO_3$ | 0.1 | — |
| Example 7 | ○ | 94.9 | 0.2 | 1.0 | 1100 | 0.1 | 5.0 | $NbO_{5/2}$ | 0.025 | — |
| Comp. Ex. 6 | X | 85.0 | 0.2 | 1.0 | 1100 | 11.7 | 3.3 | $WO_3$ | 0.025 | — |
| Example 8 | ○ | 85.0 | 0.2 | 1.0 | 1100 | 10.0 | 5.0 | $NbO_{5/2}$ | 0.025 | — |
| Comp. Ex. 7 | X | 85.0 | 0.2 | 1.0 | 1100 | 9.6 | 5.4 | $TaO_{5/2}$ | 0 | — |
| Comp. Ex. 8 | X | 85.0 | 0.2 | 1.0 | 1100 | 9.6 | 5.4 | $TaO_{5/2}$ | 0.005 | — |
| Example 9 | ○ | 85.0 | 0.2 | 1.0 | 1100 | 9.6 | 5.4 | $TaO_{5/2}$ | 0.01 | — |
| Example 10 | ○ | 85.0 | 0.2 | 1.0 | 1100 | 9.6 | 5.4 | $TaO_{5/2}$ | 0.2 | — |
| Comp. Ex. 9 | X | 85.0 | 0.2 | 1.0 | 1100 | 9.6 | 5.4 | $TaO_{5/2}$ | 0.4 | — |
| Example 11 | ○ | 86.4 | 0.2 | 1.0 | 1100 | 3.0 | 10.6 | $WO_3$ | 0.025 | — |
| Example 12 | ○ | 84.9 | 0.2 | 1.0 | 1100 | 4.8 | 10.3 | $TaO_{5/2}$ | 0.1 | — |
| Example 13 | ○ | 83.8 | 0.2 | 1.0 | 1100 | 6.0 | 10.2 | $NbO_{5/2}$ | 0.1 | — |
| Example 14 | ○ | 79.8 | 0.2 | 1.0 | 1100 | 10.0 | 10.2 | $NbO_{5/2}$ | 0.025 | — |
| Example 15 | ○ | 81.5 | 0.2 | 1.0 | 1000 | 5.8 | 12.7 | $NbO_{5/2}$ | 0.025 | 800/2 |
| Example 16 | ○ | 81.5 | 0.2 | 1.0 | 1100 | 5.8 | 12.7 | $NbO_{5/2}$ | 0.025 | 800/2 |
| Example 17 | ○ | 81.5 | 0.2 | 1.0 | 1200 | 5.8 | 12.7 | $NbO_{5/2}$ | 0.025 | 800/2 |
| Example 18 | ○ | 72.5 | 0.2 | 1.0 | 1000 | 5.2 | 22.3 | $NbO_{5/2}$ | 0.025 | 800/2 |
| Example 19 | ○ | 72.5 | 0.2 | 1.0 | 1100 | 5.2 | 22.3 | $NbO_{5/2}$ | 0.025 | 800/2 |
| Example 20 | ○ | 72.5 | 0.2 | 1.0 | 1200 | 5.2 | 22.3 | $NbO_{5/2}$ | 0.025 | 800/2 |
| Example 21 | ○ | 74.5 | 0.2 | 1.0 | 1100 | 2.6 | 22.9 | $TaO_{5/2}$ | 0.025 | — |
| Example 22 | ○ | 70.9 | 0.2 | 1.0 | 1100 | 7.4 | 21.7 | $NbO_{5/2}$ | 0.025 | — |
| Comp. Ex. 10 | X | 67.2 | 0.2 | 1.0 | 1100 | 12.2 | 20.6 | $TaO_{5/2}$ | 0.025 | — |
| Comp. Ex. 11 | X | 84.5 | 1.0 | 1.0 | 1100 | 5.0 | 10.5 | $NbO_{5/2}$ | 0.025 | 800/2 |
| Comp. Ex. 12 | X | 84.5 | 0.9 | 1.0 | 1100 | 5.0 | 10.5 | $NbO_{5/2}$ | 0.025 | — |
| Example 23 | ○ | 84.5 | 0.8 | 1.0 | 1100 | 5.0 | 10.5 | $TaO_{5/2}$ | 0.025 | — |
| Example 24 | ○ | 79.5 | 0.8 | 1.0 | 1100 | 5.0 | 15.5 | $TaO_{5/2}$ | 0.025 | — |
| Example 25 | ○ | 78.7 | 0.7 | 1.0 | 1100 | 4.8 | 16.5 | $TaO_{5/2}$ | 0.025 | 700/2 |
| Example 26 | ○ | 77.6 | 0.5 | 1.0 | 1100 | 5.0 | 17.4 | $TaO_{5/2}$ | 0.025 | — |
| Example 27 | ○ | 75.9 | 0.2 | 1.0 | 1100 | 5.4 | 18.7 | $WO_3$ | 0.025 | — |
| Example 28 | ○ | 74.5 | 0.1 | 1.0 | 1100 | 6.0 | 19.5 | $NbO_{5/2}$ | 0.025 | 900/2 |
| Comp. Ex. 13 | X | 73.0 | 0 | 1.0 | 1100 | 6.5 | 20.5 | $NbO_{5/2}$ | 0.025 | — |
| Example 29 | ○ | 74.4 | 0.2 | 1.3 | 1070 | 0.1 | 25.5 | $NbO_{5/2}$ | 0.025 | — |
| Example 30 | ○ | 87.6 | 0.2 | 1.3 | 1070 | 0.1 | 12.3 | $TaO_{5/2}$ | 0.025 | — |
| Example 31 | ○ | 82.5 | 0.2 | 1.3 | 1070 | 1.0 | 16.5 | $TaO_{5/2}$ | 0.025 | — |
| Comp. Ex. 14 | X | 76.0 | 0.2 | 1.3 | 1070 | 0.0 | 24.0 | $TaO_{5/2}$ | 0.025 | — |
| Example 32 | ○ | 70.9 | 0.2 | 1.3 | 1070 | 0.6 | 28.5 | $TaO_{5/2}$ | 0.025 | — |

TABLE 6-continued

| | evaluation | MZS | a | x | Calcinating Temp. (° C.) | Al$_2$O$_3$ | ST | Additional Component | Amount | Calcinating Temp. (° C.) |
|---|---|---|---|---|---|---|---|---|---|---|
| | | | | | I | | | II | | |
| Example 33 | ○ | 70.8 | 0.2 | 1.3 | 1070 | 1.2 | 28.0 | NbO$_{5/2}$ | 0.025 | — |
| Example 34 | ○ | 70.8 | 0.2 | 1.3 | 1070 | 1.2 | 28.0 | NbO$_{5/2}$ TaO$_{5/2}$ | 0.0125 0.0125 | — |
| Example 35 | ○ | 70.8 | 0.2 | 1.3 | 1070 | 1.2 | 28.0 | NbO$_{5/2}$ WO$_3$ | 0.0125 0.0125 | — |
| Example 36 | ○ | 70.8 | 0.2 | 1.3 | 1070 | 1.2 | 28.0 | NbO$_{5/2}$ TaO$_{5/2}$ WO$_3$ | 0.01 0.01 0.005 | — |
| Example 37 | ○ | 69.5 | 0.2 | 1.3 | 1070 | 2.5 | 28.0 | WO$_3$ | 0.025 | — |
| Example 38 | ○ | 65.0 | 0.2 | 1.3 | 1070 | 10.0 | 25.0 | NbO$_{5/2}$ | 0.025 | — |
| Example 39 | ○ | 65.0 | 0.2 | 1.3 | 1070 | 2.0 | 33.0 | NbO$_{5/2}$ | 0.025 | — |
| Example 40 | ○ | 65.0 | 0.2 | 1.3 | 1070 | 0.1 | 34.9 | WO$_3$ | 0.025 | — |
| Comp. Ex. 15 | X | 60.0 | 0.2 | 1.3 | 1070 | 10.0 | 30.0 | NbO$_{5/2}$ | 0.025 | — |
| Comp. Ex. 16 | X | 60.0 | 0.2 | 1.3 | 1070 | 2.0 | 38.0 | TaO$_{5/2}$ | 0.025 | — |
| Comp. Ex. 17 | X | 60.0 | 0.2 | 1.3 | 1070 | 0.1 | 39.9 | TaO$_{5/2}$ | 0.025 | — |
| Example 41 | ○ | 83.8 | 0.2 | 1.0 | 1070 | 6.0 | 10.2 | WO$_3$ | 0.025 | — |
| Example 42 | ○ | 82.3 | 0.2 | 1.2 | 1070 | 6.6 | 11.1 | TaO$_{5/2}$ | 0.025 | — |
| Example 43 | ○ | 80.2 | 0.2 | 1.5 | 1070 | 7.3 | 12.5 | WO$_3$ | 0.025 | — |
| Comp. Ex. 18 | X | 77.0 | 0.2 | 2.0 | 1070 | 8.5 | 14.5 | NbO$_{5/2}$ | 0.025 | — |
| Example 44 | ○ | 75.1 | 0.2 | 0.7 | 1070 | 8.5 | 16.4 | WO$_3$ | 0.025 | — |
| Comp. Ex. 19 | X | 76.7 | 0.2 | 0.5 | 1070 | 8.5 | 14.8 | TaO$_{5/2}$ | 0.025 | — |
| Example 45 | ○ | 89.9 | 0.2 | 1.3 | — | 1.3 | 8.8 | TaO$_{5/2}$ | 0.025 | — |
| Example 46 | ○ | 83.3 | 0.2 | 1.3 | — | 1.3 | 15.4 | TaO$_{5/2}$ | 0.025 | — |
| Example 47 | ○ | 75.5 | 0.2 | 1.3 | — | 1.3 | 23.2 | TaO$_{5/2}$ | 0.025 | — |
| Example 48 | ○ | 66.9 | 0.2 | 1.3 | — | 2.5 | 30.6 | TaO$_{5/2}$ | 0.025 | — |
| Example 49 | ○ | 67.8 | 0.2 | 1.3 | — | 1.2 | 31.0 | TaO$_{5/2}$ | 0.025 | — |

Thereafter, an organic binder was added to the calcinated mixture powder and granulated, followed by pressing into a sample in the form of a disk having a diameter of about 10 mm and a thickness of about 0.5 mm. The sample was then sintered by calcining it at 950–1,100° C. for 1–4 hours and coated with an Ag paste, followed by calcining at 700° C. for 15 minutes to form an outer electrode to form a ceramic condenser.

On the other hand, an organic solvent, an organic binder, a plasticizer or the like was added to the powder of the mixture, thereby yielding a slurry of the mixture, which in turn was formed by the doctor blade method in a ceramic green sheet having a thickness of 40 μm. On the surface of the green sheet was printed a Pd paste to form a Pd electrode pattern. Eleven sheets of the ceramic green sheets so prepared were then laminated alternately and pressed to bind them together forming a 10-layered laminated material. The resulting laminated material was cut into plural laminate chips.

The sample was then processed to remove the binder and calcined at about 950–1,100° C. for 1–4 hours, thereby yielding a sintered material which in turn was coated on its both end sides with an Ag paste and calcined at 700° C. for 15 minutes to form an outer electrode, thereby forming a laminated ceramic capacitor (a sample having a size: 1.0 mm by 0.5 mm by 0.5 mm; an effective tolerance area: 0.05 mm$^2$; a thickness per dielectric material sheet: 30 μm).

The disk ceramic capacitors and the laminated ceramic condensers were measured for C and Q at room temperature, HP 4,284A, 1 MHz and 1 Vrms. The dielectric constant, the insulation resistance at 150° C. and the temperature coefficient of the dielectric ratio (a variation ratio at 85° C. with reference to 20° C.) are measured each as an average value of 10 samples of the disk ceramic capacitors. The results are shown in Tables 7 ① to 2 ③.

In the Tables 7 ① to 2 ③ above, the figure of insulation resistance ρ, e.g. 2.10E +07, is intended to mean 2.10×10$^7$. The temperature coefficient TCC is computed by the following formula:

$$TCC[ppm/°C.]=(C_{85}-C_{20})/(C_{20}\times 65).$$

The leak current was measured by measuring a current value with a digital multimeter (YOKOGAWA 7552) when DC of 600 V was applied to a sample in oil at 125° C. and it was stayed stable.

TABLE 7

| | Calcining Temp. (° C.) | Properties of Disk Capacitor | | | | | Properties of Laminated Capacitor | | |
|---|---|---|---|---|---|---|---|---|---|
| | | ε$_r$ | Q | ρ (MΩ · cm) | TCC | Property | Capacitance (pF) | Q | Leak Current (μA) |
| Comp. Ex. 2 | 1100 | No finely sintered material obtained. | | | | | | | |
| Comp. Ex. 3 | 1100 | 7.5 | 2858 | 2.10E + 07 | 72.4 | CJ | 1.1 | 1905 | 1.5 |
| Comp. Ex. 4 | 1100 | 7.5 | 2733 | 2.30E + 07 | 75.2 | CJ | 1.1 | 1822 | 1.2 |
| Example 2 | 1100 | 7.4 | 2021 | 4.00E + 07 | 78.8 | CJ | 1.1 | 1490 | 0.05 |
| Example 3 | 1100 | 7.4 | 1988 | 5.00E + 07 | 72.1 | CJ | 1.1 | 1243 | 0.01 |

TABLE 7-continued

|  | Calcining Temp. (° C.) | Properties of Disk Capacitor | | | | | Properties of Laminated Capacitor | | |
|---|---|---|---|---|---|---|---|---|---|
|  |  | $\epsilon_r$ | Q | ρ (MΩ · cm) | TCC | Property | Capacitance (pF) | Q | Leak Current (μA) |
| Example 4 | 1100 | 7.3 | 1820 | 3.40E + 07 | 72.4 | CJ | 1.1 | 1534 | 0.02 |
| Comp. Ex. 5 | 1100 | No finely sintered material obtained. | | | | | | | |
| Example 5 | 1100 | 7.6 | 1565 | 6.30E + 07 | 90.1 | CJ | 1.1 | 1040 | 0.02 |
| Example 6 | 1100 | 8.0 | 1298 | 1.20E + 07 | 56.2 | CJ | 1.2 | 1049 | 0.03 |
| Example 7 | 1100 | 7.1 | 2440 | 3.00E + 07 | 100 | CJ | 1.1 | 1646 | 0.02 |
| Comp. Ex. 6 | 1100 | No finely sintered material obtained. | | | | | | | |
| Example 8 | 1100 | 8.2 | 5308 | 1.10E + 07 | −1.5 | CH | 1.2 | 3748 | 0.01 |
| Comp. Ex. 7 | 1100 | 8.2 | 5872 | 3.00E + 07 | −15 | CH | 1.2 | 3915 | 1.3 |
| Comp. Ex. 8 | 1100 | 8.0 | 4732 | 6.00E + 07 | 0 | CH | 1.2 | 3843 | 1.1 |
| Example 9 | 1100 | 7.3 | 4479 | 8.10E + 07 | 9.7 | CH | 1.1 | 3001 | 0.05 |
| Example 10 | 1100 | 7.3 | 3874 | 7.20E + 07 | 12.3 | CH | 1.1 | 2647 | 0.03 |
| Comp. Ex. 9 | 1100 | No finely sintered material obtained. | | | | | | | |
| Example 11 | 1050 | 7.9 | 7887 | 3.20E + 07 | −22 | CH | 1.2 | 6383 | 0.02 |
| Example 12 | 1100 | 8.3 | 6536 | 8.80E + 06 | −43 | CH | 1.2 | 4838 | 0.02 |
| Example 13 | 1100 | 6.1 | 6594 | 7.10E + 06 | −36 | CH | 0.9 | 5364 | 0.02 |
| Example 14 | 1100 | 8.6 | 5643 | 7.70E + 06 | −56 | CH | 1.3 | 3849 | 0.02 |
| Example 15 | 1035 | 7.5 | 7698 | 4.80E + 06 | −3.8 | CH | 1.1 | 5336 | 0.02 |
| Example 16 | 1035 | 8.9 | 9786 | 2.00E + 07 | −12 | CH | 1.3 | 6524 | 0.02 |
| Example 17 | 1035 | 7.9 | 8975 | 1.00E + 07 | 10.8 | CH | 1.2 | 5737 | 0.02 |
| Example 18 | 1025 | 11.9 | 6548 | 6.10E + 06 | −167 | RH | 1.8 | 3456 | 0.02 |
| Example 19 | 1035 | 12.7 | 7685 | 7.90E + 06 | −348 | SH | 1.9 | 5377 | 0.02 |
| Example 20 | 1025 | 11.4 | 1547 | 6.30E + 07 | −196 | RH | 1.7 | 1031 | 0.02 |
| Example 21 | 1000 | 13.1 | 6590 | 5.30E + 06 | −299 | SH | 2.0 | 5636 | 0.01 |
| Example 22 | 1035 | 12 | 2390 | 1.20E + 07 | −230 | RH | 1.8 | 1593 | 0.03 |
| Comp. Ex. 10 | 1100 | No finely sintered material obtained. | | | | | | | |
| Comp. Ex. 11 | 1100 | No finely sintered material obtained. | | | | | | | |
| Comp. Ex. 12 | 1100 | No finely sintered material obtained. | | | | | | | |
| Example 23 | 1100 | 7.8 | 2870 | 1.90E + 07 | 35.2 | CH | 1.2 | 1919 | 0.01 |
| Example 24 | 1100 | 11.5 | 5675 | 3.90E + 07 | −45 | CH | 1.7 | 3848 | 0.02 |
| Example 25 | 1100 | 7.9 | 1443 | 4.30E + 07 | 20.2 | CH | 1.2 | 1098 | 0.01 |
| Example 26 | 1050 | 9.1 | 2180 | 4.60E + 07 | −24 | CH | 1.4 | 1453 | 0.03 |
| Example 27 | 1050 | 10.4 | 1854 | 3.00E + 07 | −124 | PH | 1.6 | 1236 | 0.02 |
| Example 28 | 1050 | 9.9 | 1867 | 5.50E + 07 | −165 | RH | 1.5 | 1244 | 0.01 |
| Comp. Ex. 13 | 1030 | 6.3 | 657 | 4.50E + 07 | −235 | RH | 0.9 | 438 | 0.01 |
| Example 29 | 1030 | 11.5 | 8528 | 4.20E + 07 | −60 | CH | 1.7 | 5665 | 0.01 |
| Example 30 | 1030 | 8.4 | 3429 | 3.30E + 07 | 17.5 | CH | 1.3 | 2366 | 0.02 |
| Example 31 | 975 | 13.7 | 6795 | 6.20E + 07 | −235 | RH | 2.1 | 4530 | 0.02 |
| Comp. Ex. 14 | 1100 | No finely sintered material obtained. | | | | | | | |
| Example 32 | 1060 | 13.1 | 4976 | 3.20E + 07 | −176 | RH | 2.0 | 3388 | 0.02 |
| Example 33 | 1060 | 13.9 | 6576 | 5.30E + 07 | −235 | RH | 2.1 | 4544 | 0.02 |
| Example 34 | 1060 | 13.6 | 6485 | 6.90E + 07 | −240 | RH | 2.0 | 4323 | 0.02 |
| Example 35 | 1060 | 12.8 | 5834 | 5.10E + 07 | −210 | RH | 1.9 | 3998 | 0.02 |
| Example 36 | 1060 | 11.9 | 4982 | 2.50E + 07 | −199 | RH | 1.8 | 3321 | 0.02 |
| Example 37 | 1030 | 12.3 | 8762 | 3.80E + 07 | −123 | PH | 1.8 | 5646 | 0.01 |
| Example 38 | 1100 | 13.2 | 9556 | 5.10E + 07 | −301 | SH | 2.0 | 6371 | 0.02 |
| Example 39 | 1100 | 13.6 | 6832 | 3.20E + 07 | −345 | SH | 2.0 | 4555 | 0.02 |
| Example 40 | 1050 | 14.8 | 5632 | 4.30E + 07 | −376 | SH | 2.2 | 3880 | 0.02 |
| Comp. Ex. 15 | 1100 | No finely sintered material obtained. | | | | | | | |
| Comp. Ex. 16 | 1100 | No finely sintered material obtained. | | | | | | | |
| Comp. Ex. 17 | 1100 | 22.1 | 3292 | 6.10E + 07 | −432 |  | 3.3 | 2195 | 0.01 |
| Example 41 | 1075 | 7.7 | 6943 | 3.10E + 07 | −3.6 | CH | 1.2 | 4659 | 0.01 |
| Example 42 | 1075 | 8.1 | 7865 | 2.70E + 07 | −13 | CH | 1.2 | 5243 | 0.01 |
| Example 43 | 1075 | 7.7 | 6985 | 5.20E + 06 | 45.1 | CH | 1.2 | 4535 | 0.01 |
| Comp. Ex. 18 | 1100 | No finely sintered material obtained. | | | | | | | |
| Example 44 | 1075 | 7.3 | 3545 | 5.10E + 07 | 56.5 | CH | 1.1 | 2363 | 0.02 |
| Comp. Ex. 19 | 1075 | 6.7 | 786 | 2.40E + 07 | 25.9 | CH | 1.0 | 524 | 0.02 |
| Example 45 | 1050 | 7.2 | 5678 | 1.70E + 07 | 89.1 | CJ | 1.1 | 3654 | 0.01 |
| Example 46 | 1050 | 8.6 | 6548 | 1.20E + 07 | −13 | CH | 1.3 | 4365 | 0.01 |
| Example 47 | 1050 | 9.9 | 6987 | 4.80E + 07 | −68 | CJ | 1.5 | 4660 | 0.02 |
| Example 48 | 1050 | 12 | 7650 | 9.70E + 06 | −207 | RH | 1.8 | 5122 | 0.01 |
| Example 49 | 1035 | 11.4 | 6755 | 3.90E + 07 | −166 | RH | 1.7 | 4503 | 0.01 |

From the results as indicated in the Tables 7 ① to 2 ③ above, the following can be found. As shown in Comparative Examples 15, 16 and 17, it is found that when the mole percent ratio of the MZS becomes smaller than 65.0 mole percent, no finely sintered material can be obtained by calcining at temperature lower than 1,100° C. or the dielectric ratio $\epsilon_r$ may become greater than 15 and the temperature coefficient TCC may become too great toward the minus side.

Further, as shown in Comparative Examples 6 and 10, it is found that when the mole percent ratio of the alumina, $Al_2O_3$, becomes greater than 10.0 mole percent, no finely sintered material can be obtained by calcining at temperature lower than 1,100° C. Moreover, as shown in Comparative Example 14, it is found that when the mole percent ratio of the alumina, $Al_2O_2$, becomes smaller than 0.1 mole percent, no finely sintered material can be obtained by calcining at temperature lower than 1,100° C.

It is further found that when the mole percent ratio of the strontium titanate, SrTiO₃, becomes greater than 34.9 mole percent as shown in Comparative Examples 16 and 17, on the one hand, no finely sintered material can be obtained or the dielectric ratio may become so high that the temperature coefficient may become too high toward the minus side and when the mole percent ratio thereof becomes smaller than 5.0 mole percent as shown in Comparative Examples 2 and 6, on the other hand, no finely sintered material can be obtained by calcining at temperature lower than 1,100° C.

Furthermore, it is found that, when the symbol a becomes greater than 0.8 as shown in Comparative Examples 11 and 12, on the one hand, no finely sintered material can be obtained by calcining at temperature lower than 1,100° C. and that, when the symbol a becomes smaller than 0.1 as shown in Comparative Example 13, on the other, a large number of pores are caused to be formed in the sintered material and the factor Q may become smaller than 1,000.

Moreover, it is found that, when the symbol x becomes greater than 1.5 as shown in Comparative Example 18, on the one hand, any finely sintered material cannot be obtained by calcining at temperature lower than 1,100° C. and that, when the symbol x becomes smaller than 0.67 as shown in Comparative Example 19, on the other, the resulting sintered material may become likely to fuse, a range of optimum temperature for calcining may become so narrow that a large number of pores are caused to be formed in the sintered material and the factor Q may become smaller than 1,000.

In addition, it is found that, if the mole percent ratio of $NbO_{5/2}$, $TaO_{5/2}$ or $WO_3$ becomes smaller than 0.01 mole percent as shown in Comparative Examples 3, 4, 7 and 8, on the one hand, leak current may become higher than 1.0 μA or larger without achieving any improvements in leak current and that, when the mole percent ratio thereof becomes greater than 0.2 mole percent as shown in Comparative Examples 5 and 9, on the other, no finely sintered material can be obtained by calcining at temperature lower than 1,100° C.

Further, when $NbO_{5/2}$, $TaO_{5/2}$ or $WO_3$ as the additive component is added in the mole percent ratio in the range of from 0.01 to 0.2 mole percent, as shown in Examples 2–4 and 5–10, effects of improving leak current are recognized. As shown in Examples 33–36, it is also found that similar effects can be obtained when the additive components are added in a mixed state.

In addition, it is found that, although desired properties can be achieved by using the mixture consisting of MZS, alumina, $Al_2O_3$, and strontium titanate, $SrTiO_3$, whether they are calcinated or not, electrical properties may vary whether the calcination is carried out or not. It is also found that the calcination is effective if a reaction between the additive components and the major components or between the additive components is caused to occur and a crystal system is caused to change, thereby causing a shrinkage rapidly or increasing a shrinkage ratio. In other words, this is effective for controlling an occurrence of structural defects, such as delamination, cracking and so on.

Moreover, the dielectric ceramic compositions according to the present invention are found, as indicated by acceptable evaluations (marked by "○") as shown in Tables 6 ① to 1 ③ that they can be sintered at temperature lower than 1,100° C. or less, the dielectric ratio is as low as 15 or less, the factor Q is as high as 1,000 or larger at 1 MHz, the resistivity at 150° C. is as high as 1.0×10³ M Ωcm, the temperature coefficient TCC of capacitance is small, and the following properties as set forth in the JIS standardaization are met:

CH Property (−60 to +60 ppm/° C.)
CJ Property (−120 to +120 ppm/° C.)
PH Property (−90 to −210 ppm/° C.)
RH Property (−160 to −280 ppm/° C.)
H Property (−270 to −390 ppm/° C.).

EFFECTS OF THE INVENTION

The present invention can achieve the effects that the surface of the ceramic layer can be made very even, the surface resistance of the internal electrode can be made small and frequency properties of factor Q of laminated electronic parts, particularly factor Q, i.e. the frequency properties in a high frequency region, can be made favorable.

Further, the present invention can make a range of optimum amounts of binders and plasticizers wider, minimize mold flashing upon cutting into laminate chips, and improve a sheet-binding strength, thereby preventing the laminated layers from deviating from each other and preventing air from being mixed therein. Therefore, the present invention can provide highly reliable laminated electronic parts.

Moreover, the present invention can offer the effects that the factor Q can be made high in a high frequency region ranging from several hundreds MHz to several GHz and there can be obtained ceramic condensers having a low capacitance of 0.01 pF to 30 pF, as well as a low loss and a low leak current.

Furthermore, the present invention can present the effects that the temperature for sintering the dielectric ceramic compositions can be decreased to 1,100° C. or lower so that an occurrence of structural defects, such as delamination or the like, can be controlled, and power costs required for calcining etc. in the production of ceramic capacitors can be decreased, thereby reducing the costs of manufacturing them.

In addition, the present invention can be effective for preparing highly reliable ceramic condensers because pure Pd can be employed for a raw material for an internal electrode.

What is claimed is:

1. A laminated electronic part comprising one or more ceramic layers and two or more internal electrodes laminated alternately with each other, wherein roughness on an interface between said ceramic layer and said internal layer is 0.2 μm or less.

2. The laminated electronic part as claimed in claim 1, wherein said ceramic layer is a dielectric ceramic composition and said ceramic layer is interposed between said internal electrodes to form a ceramic capacitor.

3. The laminated electronic part as claimed in claim 2, wherein said dielectric ceramic composition comprises a sintered material of a mixture containing a major component obtained by calcinating magnesium zinc silicate, $(Mg_aZn_{(1-a)})_xSiO_{x+2}$, alumina $Al_2O_3$, and strontium titanate SrTiO3 and where X is greater than 0.

4. The laminated electronic part as claimed in claim 3, wherein said major component is represented by general formula:

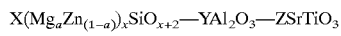

(where symbol a is defined by: $0.1 \leq a \leq 0.8$; and symbol x is defined by: $0.67 \leq x \leq 1.5$);
and an additive component comprised of a compound containing one or more elements selected from Nb, Ta and W; wherein a mole percent ratio of $((Mg_aZn_{(1-a)})_xSiO_{x+2})$, (X), to $Al_2O_3$, (Y), and $SrTiO_3$ (Z), each of which constitutes said major component, is set to be located in a region enclosed by a polygon having apexes at points A, B, C and D, as defined below, in a three-component composition map:

| | | |
|---|---|---|
| A (94.9, | 0.1, | 5.0) |
| B (85.0, | 10.0, | 5.0) |
| C (65.0, | 10.0, | 25.0) |
| D (65.0, | 0.1, | 34.9); | and said additive component is contained at a rate of 0.01 to 0.2 mole percent, when translated into $NbO_{5/2}$, $TaO_{5/2}$ or $WO_3$.

5. A dielectric ceramic composition comprising a major component as represented by general formula:

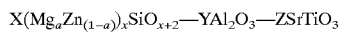

$X(Mg_aZn_{(1-a)})_xSiO_{x+2}$—$YAl_2O_3$—$ZSrTiO_3$ (where symbol a is defined by: $0.1 \leq a \leq 0.8$; and symbol x is defined by: $0.67 \leq x \leq 1.5$);
and an additive component comprised of a compound containing one or more elements selected from Nb, Ta and W;

wherein a mole percent ratio of $((Mg_aZn_{(1-a)})_xSiO_{x+2})$, (X), to $Al_2O_3$, (Y), and $SrTiO_3$ (Z), each of which constitutes said major component, is set to be located in a region enclosed by a polygon having apexes at points A, B, C and D, as defined below, in a three-component composition map:

| | | |
|---|---|---|
| A (94.9, | 0.1, | 5.0) |
| B (85.0, | 10.0, | 5.0) |
| C (65.0, | 10.0, | 25.0) |
| D (65.0, | 0.1, | 34.9); | and said additive component is contained at a rate of 0.01 to 0.2 mole percent, when translated into $NbO_{5/2}$, $TaO_{5/2}$ or $WO_3$.

* * * * *